US006566472B1

(12) United States Patent
Baumstark et al.

(10) Patent No.: US 6,566,472 B1
(45) Date of Patent: May 20, 2003

(54) BINDER FORMULATIONS BASED ON AQUEOUS POLYMER DISPERSIONS

(75) Inventors: Roland Baumstark, Neustadt (DE); Stefan Kirsch, Heidesheim (DE); Rolf Dersch, Neustadt (DE); Johannes Dobbelaar, Palm Spring (SG); Michael Melan, Wachenheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 227 days.

(21) Appl. No.: 09/640,072

(22) Filed: Aug. 17, 2000

(30) Foreign Application Priority Data

Aug. 19, 1999 (DE) .......................... 199 39 327

(51) Int. Cl.$^7$ ..................... C08F 226/06; C08F 220/18; C08F 112/08
(52) U.S. Cl. ................. 526/263; 526/307.5; 526/307.6; 526/307.7; 526/318.41; 526/318.42; 526/347.1; 526/319; 524/809; 524/812; 524/824
(58) Field of Search ............................. 526/263, 307.5, 526/307.6, 307.7, 318.41, 318.42, 347.1, 319; 524/809, 812, 824

(56) References Cited

U.S. PATENT DOCUMENTS 4,477,623 A * 10/1984 Pons ........................... 524/710
5,308,890 A    5/1994  Snyder
5,731,377 A    3/1998  Friel
5,905,114 A    5/1999  Baumstark et al.

FOREIGN PATENT DOCUMENTS

| CA | 2114246 | 7/1994 |
| EP | 466 409 | 1/1992 |
| EP | 609 756 | 8/1994 |
| EP | 612 805 | 8/1994 |
| EP | 0 810 274 | 12/1997 |
| EP | 810 274 | 12/1997 |

OTHER PUBLICATIONS

99:177574 Feicke.*
105:210362 Snuparek.*
117:92544 Tatsumi.*
130:238836 Wu.*
European Committe for Standardization, XP–002066658, pp. 1–28, "Paints and Varnishes—Terms and Definitions for Coating Materials—Part 1: General Terms", Apr. 1996.

* cited by examiner

Primary Examiner—Robert D. Harlan
(74) Attorney, Agent, or Firm—Oblon, Spivak, McClelland, Maier & Neustadt, P.C.

(57) ABSTRACT

Binder formulations based on aqueous polymer dispersions having a minimum film-forming temperature of below 10° C. and comprising at least one binder polymer P in the form of an aqueous dispersion comprising at least one anionic emulsifier and at least one nonionic emulsifier.

27 Claims, No Drawings

BINDER FORMULATIONS BASED ON AQUEOUS POLYMER DISPERSIONS

The present invention relates to binder formulations having a minimum film-forming temperature of less than 10° C. on the basis of an aqueous polymer dispersion.

For reasons of environmental protection and occupational hygiene, modern coating compositions, especially those used in enclosed spaces, such as emulsion paints and dispersion plasters, for example, contain a binder formulation based on an aqueous polymer dispersion. The polymer particles present in the polymer dispersion film on drying to form a polymeric coating which binds any pigment particles and fillers present.

The formation of a uniform and thus stable polymeric coating is only ensured, however, when the coating composition is processed at a temperature which lies above the minimum film-forming temperature of the polymer in the binder formulation.

A low minimum film-forming temperature is ensured in principle when using binders whose polymers have a low glass transition temperature. However, these binders have the disadvantage that the polymer film remains soft and is tacky. This, in turn, has the consequences for the coating of low blocking resistance and high soiling tendency. Alternatively, the minimum film-forming temperature of a polymeric binder may be lowered by processing it with film-forming auxiliaries (coalescants). These are volatile organic compounds, examples being solvents or plasticizers, which when the coating is dried facilitate film formation, initially, and on further drying are emitted to the environment, thereby increasing the surface hardness of the polymer film and reducing its tackiness. This process, however, entails an unwanted burden on the environment. There is therefore an increased need for binders based on aqueous polymer dispersions which ensure uniform film formation without the addition of coalescence auxiliaries and which lead to coatings having high blocking resistance and low soiling tendency.

EP-A-609 756 and EP-612 805 disclose binders based on aqueous polymer dispersions which are suitable for preparing solvent-free dispersions. The binder polymers are multiphase, multistage polymers comprising a hard polymer phase and a soft polymer phase. Polymers of this kind are comparatively difficult to prepare, however.

EP-A-466 409 describes coalescant-free coating compositions comprising as binder a blend of two aqueous polymer dispersions. The polymer of one polymer dispersion has a glass transition temperature above room temperature and the other polymer has a glass transition temperature of below 20° C.

EP-810 274 describes binders for low-emission coating compositions based on aqueous styrene acrylate polymer dispersions having an average film-forming temperature of below 10° C. and containing less than 1% by weight of acidic monomers in copolymerized form. Binders of this kind are particularly suitable for highly pigmented coatings, i.e., for coatings having a pigment volume concentration PVC≧60. The pigment volume concentration PVC, here and below, is 100 times the ratio of the total volume of pigments plus fillers divided by the total volume of pigments, fillers and binder polymers; cf. Ullmanns Enzyklopädie d. Techn. Chem., 4th ed., vol. 15, p. 667. While these binders lead to increased wet abrasion resistance of the coatings at high pigment contents, their surface tack and blocking resistance at lower pigment contents leave something to be desired.

It is an object of the present invention to provide a binder which is based on an aqueous polymer dispersion and both ensures uniform film formation without the addition of coaslescence auxiliaries and leads to coatings of low tack and high blocking resistance.

We have found that this object is achieved by the binder formulations defined below, based on aqueous polymer dispersions, which surprisingly meet these requirements to a particular degree.

Accordingly, the present invention provides binder formulations having a minimum film-forming temperature of below 10° C. and comprising at least one binder polymer P in the form of an aqueous dispersion comprising at least one anionic emulsifier and at least one nonionic emulsifier, the binder polymer P being composed of:

from 20 to 50% by weight of at least one monomer A1, selected from vinylaromatic monomers, from 0 to 15% by weight of one or more monomers A2, selected from the $C_1$–$C_4$ alkyl esters of methacrylic acid, from 0 to 30% by weight of one or more monomers A3, selected from acrylonitrile and methacrylonitrile, from 45 to 70% by weight of at least one monomer B whose homopolymer has a glass transition temperature of below 10° C., selected from the $C_1$–$C_{18}$ alkyl esters of acrylic acid and the $C_5$–$C_{18}$ alkyl esters of methacrylic acid, from 2 to 4% by weight of methacrylic acid as monomer C, from 0 to 3% by weight of one or more monomers D selected from the amides, $C_1$–$C_4$ hydroxyalkyl esters and $C_1$–$C_4$ alkyl polyalkylene oxide esters of monoethylenically unsaturated $C_3$–$C_6$ monocarboxylic acids, from 0 to 5% by weight of one or more monomers E other than the monomers A1, A2, A3, B, C and D, the weight fractions of all monomers being based on 100% by weight, the sum of the weight fractions of the monomers A1, A2 and A3 not exceeding 55% by weight, preferably 50% by weight, and the weight fraction of the monomers A2 being at least 5% by weight if the weight fraction of the monomers A3 is below 0.5% by weight. Preferably, the binder formulations of the invention contain the binder polymer P as sole binder.

The minimum film-forming temperature MFT is defined as the temperature below which the polymer in the coating composition no longer forms a coherent polymer film. The minimum film-forming temperature is situated preferably within the range from 10 to 0° C. Valid minimum film-forming temperatures are the values determined in accordance with DIN 53787 (see Ullmanns Enzyklopädie d. Techn. Chem., 4th ed., vol. 19, p. 17). The MFT correlates approximately with the glass transition temperature $T_g$ of the binder polymer P. It is generally up to 10 K below its glass transition temperature. Accordingly, the binder polymer P generally has a glass transition temperature $T_g$ of not more than 20° C. and preferably not more than 15° C. In general, the glass transition temperature $T_g$ of the binder polymer will not be below –10° C., preferably –5° C., in particular 0° C.

The term glass transition temperature as used in this specification means the glass transition temperature (cf. ASTM D 3418-82) determined by the DSC technique (differential scanning calorimetry, 20° C./min, midpoint).

In order to establish the desired $T_g$ in the preparation of the polymer P, the skilled worker will start from an appropriate monomer mixture. According to Fox (T. G. Fox, Bull. Am. Phys. Soc. (Ser. II) 1, 1956, p. 123 and Ullmanns Enzyklopädie der Techn. Chem., 4th ed., vol. 19. Verlag Chemie, Weinheim (1980), pp. 17–18), the glass transition temperature of copolymers at high molecular masses is given in good approximation by $$\frac{1}{T_g} = \frac{X^1}{T_g^1} + \frac{X^2}{T_g^2} + \cdots \frac{X^n}{T_g^n}$$

where $X^1, X^2, \ldots, X^n$ are the mass fractions of the monomers $1, 2, \ldots, n$ and $T_g^1, T_g^2, \ldots, T_g^n$ are the glass transition temperatures of the homopolymers composed in each case of only one of the monomers $1, 2, \ldots, n$, in degrees Kelvin. Sources of tabulated glass transition temperatures of homopolymers are, for example, Ullmann's Encyclopedia of Ind. Chem., $5^{th}$ ed., VCH, Weinheim, Vol. A 21 (1992) p. 169 and J. Brandrup, E. H. Immergut, Polymer Handbook $2^{nd}$ ed, J. Wiley, New York, 1975, pp. 139–192.

Examples of vinylaromatic monomers A1 are styrene, α-methyl-styrene, ($C_1$–$C_4$)alkyl styrenes such as methylstyrenes and tert-butyl styrene, and methoxystyrenes. The preferred monomer A1 is styrene. Preferably, the binder polymer P of the invention contains the monomers A1 copolymerized in an amount of from 20 to 40% by weight, and in particular from 20 to 35% by weight.

Examples of monomers A2 are methyl methacrylate, ethyl methacrylate, n-propyl methacrylate, n-butyl methacrylate, isobutyl methacrylate and tert-butyl methacrylate. The preferred monomer A2 is methyl methacrylate. The binder polymers P preferably contain at least 5% by weight, and in particular from 5 to 15% by weight, of copolymerized monomers A2. With particular preference, the binder polymer P contains from 20 to 40% by weight, in particular from 20 to 35% by weight, of copolymerized styrene and from 5 to 15% by weight, in particular from 5 to 10% by weight, of copolymerized methyl methacrylate.

The monomers B embrace, for example, the esters of acrylic acid with $C_2$–$C_{18}$ alkanols, preferably with $C_1$–$C_{10}$ alkanols, and in particular with $C_1$–$C_8$ alkanols. Suitable $C_2$–$C_{18}$ alkanols are ethanol, n-propanol, i-propanol, 1-butanol, 2-butanol, n-hexanol, 2-ethylhexanol, lauryl alcohol, and stearyl alcohol. The monomers B also include the esters of methacrylic acid with $C_5$–$C_{18}$ alkanols. Examples of preferred monomers B are ethyl acrylate, n-butyl acrylate, i-butyl acrylate, n-hexyl acrylate, 2-ethylhexyl acrylate, n-hexyl methacrylate, and 2-ethylhexyl methacrylate. Particularly preferred monomers B are ethyl acrylate, n-butyl acrylate, and 2-ethylhexyl acrylate. The binder polymer P preferably contains the monomers B copolymerized in an amount of from 50 to 65% by weight.

In addition, the binder polymer P may contain a minor amount, i.e., <0.5% by weight, based on the total weight of all monomers, of other monomers having acid groups, such as acrylic acid, itaconic acid, vinylacetic acid, 2-(acrylamido)-2-methyl-propanesulfonic acid, vinylsulfonic acid or vinylphosphonic acid, in copolymerized form, the acid group monomers frequently being used in their salt form, for example, as alkali metal salt or ammonium salt.

The amides of monoethylenically unsaturated $C_3$–$C_6$ monocarboxylic acids, specified under the monomers D, include, for example, the amides of acrylic acid and of methacrylic acid. The $C_1$–$C_4$ hydroxyalkyl esters of monoethylenically unsaturated $C_3$–$C_6$ monocarboxylic acids specified under the monomers D include, for example, the 2-hydroxyethyl esters, the 2- or 3-hydroxypropyl esters, and the 2- or 4-hydroxybutyl esters of acrylic acid and of methacrylic acid. The monomers D further include the esters of monoethylenically unsaturated $C_3$–$C_6$ carboxylic acids with polyalkylene glycols and their monoethers, especially the esters with polyethylene glycols and the esters with monoalkyl ethers of polyethylene glycols. Examples of such monomers are specified in U.S. Pat. No. 5,610,225. Preferred monomers D are acrylamide, methacrylamide, and hydroxyethyl acrylate. Preferably, the monomers D are used in an amount of at least 0.5% by weight, in particular in an amount of from 0.5 to 2% by weight, and with very particular preference in an amount of from 1 to 1.5% by weight, based on the total weight of the monomers A to E which form the polymer.

In addition, the binder polymer P may also contain copolymerized monomers other than the monomers A to D. The monomers E include on the one hand the abovementioned monomers, other than methacrylic acid, having an acid group. The weight fraction of all acid group monomers, including methacrylic acid, will preferably not exceed 4% by weight. In particular, the polymer P of the invention contains no monomers having an acid group, other than methacrylic acid.

The monomers E further include monomers having two or more nonconjugated double bonds, such as ethylene glycol diacrylate, 1,4-butanediol diacrylate, allyl acrylate and allyl methacrylate, trimethylolpropane triacrylate, and trimethylolpropane trimethacrylate. Polyolefinically unsaturated monomers are used, if desired, in amounts<1% by weight, based on the total weight of all the monomers which form the polymer P.

The monomers E further include those monomers which in addition to an ethylenically unsaturated double bond have a reactive functional group, e.g., an aldehyde group, a keto group, or an oxirane group. Functional groups of this kind in the polymer P lead to crosslinking in the course of film formation or may be crosslinked with the aid of a crosslinker during film formation. Examples of monomers E of this kind are acrolein, methacrolein, diacetoneacrylamide and diacetonemethacrylamide, vinyl acetoacetate or the esters of acetoacetic acid with hydroxyalkyl acrylates and hydroxyalkyl methacrylates, examples being 2-acetoacetoxyethyl acrylate and 2-acetoacetoxyethyl methacrylate, and also glycidyl esters of ethylenically unsaturated carboxylic acids, such as glycidyl acrylate and glycidyl methacrylate. Additional crosslinkers that are suitable include nonvolatile polyamine compounds having two or more reactive amino groups. Examples of these are oxalic dihydrazide, malonic dihydrazide, and adipic dihydrazide.

The monomers E further include those monomers which contain urea groups, examples being N-vinylurea and N-allylurea, and derivatives of imidazolidin-2-one, examples being N-vinyl- and N-allylimidazolidin-2-one, N-vinyloxyethylimidazolidin-2-one, N-(2-(meth)acrylamidoethyl)imidazolidin-2-one, N-(2-(meth)-acryloxyethyl)imidazolidin-2-one, N-[2-((meth)acryloxyacetamido)-ethyl]imidazolidin-2-one, etc. These monomers are used preferably in amounts of up to 10% by weight, in particular from 0.5 to 5% by weight, based on the total weight of the polymer P. Monomers of this kind improve the wet adhesion of the coatings obtainable from the formulations of the invention, that is, the adhesion of the coating in the moist or swollen state. Monomers containing urea groups are used, if desired, in amounts of from 0.1 to 5% by weight, preferably from 0.2 to 3% by weight, and in particular from 0.5 to 2% by weight.

The monomers E further include monomers containing siloxane groups, examples being vinyltrialkoxysilanes, such as vinyl-trimethoxysilane, alkylvinyldialkoxysilanes, or (meth)acryloxy-alkyltrialkoxysilanes, examples being (meth)acryloxyethyl-trimethoxysilane and (meth)acryloxypropyltrimethoxysilane. These monomers may be used in amounts of up to 1% by weight, preferably from 0.05 to 0.5% by weight, based on the total monomer amount.

With very particular preference, the polymer P is composed of from 50 to 65% by weight, in particular from 54 to 60% by weight, of n-butyl acrylate and/or 2-ethylhexyl acrylate, from 20 to 40% by weight, in particular from 25 to 30% by weight, of styrene, from 5 to 10% by weight of methyl methacrylate, from 2 to 4% by weight, in particular from 2.2 to 3% by weight, and especially from 2.4 to 2.8% by weight, of methacrylic acid, from 1 to 2% by weight, in particular from 1 to 1.5% by weight, of acrylamide and/or hydroxyethyl acrylate, from 0 to 2% by weight (if desired, e.g., from 0.1 to 2% by weight) of N-(2-methacryloxyethyl)imidazolin-2-one.

As a result of their preparation, binders based on aqueous polymer dispersions generally contain emulsifiers which serve to stabilize the polymer particles in the aqoeus polymer dispersion. The binder formulations of the invention comprise at least one anionic emulsifier and at least one nonionic emulsifier. Appropriate emulsifiers are the compounds commonly used for such purposes. An overview of appropriate emulsufiers can be found in Houben-Weyl, Methoden der organischen Chemie, volume XIV/1, Makromolekulare Stoffe [Macromolecular Substances], Georg-Thieme-Verlag, Stuttgart, 1961, pp. 192–208.

The preferred anionic emulsifiers include alkali metal salts and ammonium salts, especially the sodium salts, of alkyl sulfates (alkyl: $C_8$–$C_{20}$), of sulfuric monoesters with ethoxylated alkanols (EO units: 2 to 50, alkyl: $C_{10}$–$C_{20}$), and of alkylsulfonic acids (alkyl: $C_{10}$–$C_{20}$), and also mono- and di-($C_4$–$C_{24}$ alkyl)diphenyl ether disulfonates of the formula I

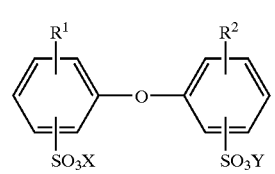

in which $R^1$ and $R^2$ are hydrogen or $C_4$–$C_{24}$ alkyl, preferably $C_8$–$C_{16}$ alkyl, but are not simultaneously hydrogen, and X and Y may be alkali metal ions and/or ammonium ions. It is common to use technical mixtures containing a fraction of from 50 to 90% by weight of monoalkylated product, an example being Dowfax® 2A1 ($R^1$=$C_{12}$ alkyl; DOW CHEMICAL). The compounds I are general knowledge, for example, from U.S. Pat. No. 4,269,749, and are obtainable commercially.

Preferred anionic emulsifiers are the $C_{10}$–$C_{18}$ alkyl sulfates and the sulfates of ethoxylated $C_{10}$–$C_{20}$ alkanols having a degree of ethoxylation≦5, and also the mono- and di($C_8$–$C_{16}$ alkyl)diphenyl ether disulfonates. In this context it has proven favorable if the binder formulations of the invention contain, as anionic emulsifiers, at least one $C_{10}$–$C_{18}$ alkyl sulfate and at least one mono- or di-($C_8$–$C_{16}$ alkyl)diphenyl ether disulfonate. In that case the weight ratio of the two emulsifiers is situated preferably within the range from 1:10 to 10:1 and in particular within the range from 2:1 to 1:2. In general, the binder contains from 0.1 to 5% by weight, preferably from 0.5 to 3% by weight, and in particular from about 1 to 2% by weight, of anionic emulsifiers, based on the total weight of the polymer P.

Preferred nonionic emulsifiers are aliphatic nonionic emulsifiers, examples being ethoxylated long-chain alcohols (EO units: 3 to 50, alkyl: $C_8$–$C_{36}$) and polyethylene oxide/polypropylene oxide block copolymers. Preference is given to ethoxylates of long-chain alkanols (alkyl: $C_{10}$–$C_{22}$, average degree of ethoxylation: from 3 to 50) and, of these, particular preference to those based on naturally occurring alcohols or oxo alcohols having a linear or branched $C_{12}$–$C_{18}$ alkyl radical and a degreee of ethoxylation of from 8 to 50. Particularly preferred nonionic emulsifiers are the ethoxylates of oxo alcohols having a branched $C_{10}$–$C_{16}$ alkyl radical and an average degree of ethoxylation in the range from 8 to 20, and also fatty alcohol ethoxylates having a linear $C_{14}$–$C_{18}$ alkyl radical and an average degree of ethoxylation in the range from 10 to 30. Nonionic emulsifiers are used normally in an amount of from 0.1 to 5% by weight, in particular from 0.3 to 3% by weight, and especially in the range from 0.5 to 2% by weight, based on the total weight of the polymer P. Preferably, the total amount of anionic and nonionic emulsifier will not exceed 5% by weight, based on the total weight of the polymer P, and in particular is in the range from 0.5 to 4% by weight.

Preferably, the binder formulation of the invention comprises neither alkylphenolsulfonates nor sulfates of alkoxylated alkylphenols as anionic emulsifier. Preferably, the binder formulation of the invention contains no alkoxylated alkylphenols.

In accordance with the invention, it has proven advantageous if the polymer particles of the binder polymer P in the aqueous dispersion have a weight-average polymer particle diameter of less than 500 nm, preferably in the range from 50 to 300 nm, and with particular preference in the range from 80 to 200 nm (determined by means of an ultracentrifuge or by photon correlation spectroscopy; on particle size determination using an ultracentrifuge see, e.g., W. Machtle, Mäkromolekulare Chemie, 1984, vol. 185, 1025–1039; W. Mächtle, Angew. Makromolekulare Chemie, 162, 1988, 35–42).

The aqueous dispersions of the binder polymer P are prepared by free-radical aqueous emulsion polymerization of the aforementioned monomers in the presence of at least one free-radical polymerization initiator and, if desired, of a surface-active substance.

Suitable free-radical polymerization initiators are all those capable of triggering a free-radical aqueous emulsion polymerization. They may include both peroxides, such as alkali metal peroxodisulfates, and azo compounds. As polymerization initiators it is common to use what are known as redox initiators, which are composed of at least one organic reducing agent and at least one peroxide and/or hydroperoxide, an example being tert-butyl hydroperoxide with sulfur compounds, e.g., the sodium salt of hydroxymethanesulfinic acid, sodium sulfite, sodium disulfite, sodium thiosulfate, or acetone-bisulfite adduct, or hydrogen peroxide with ascorbic acid. Use is also made of combined systems which contain a small amount of a metal compound which is soluble in the polymerization medium and whose metallic component is able to exist in a plurality of valence states, an example being ascorbic acid/iron(II) sulfate/hydrogen peroxide, in which the ascorbic acid is frequently replaced by the sodium salt of hydroxymethansulfinic acid, acetone-bisulfite adduct, sodium sulfite, sodium hydrogen sulfite, or sodium bisulfite, and the hydrogen peroxide by organic peroxides such as tert-butyl hydroperoxide or alkali metal peroxodisulfates and/or ammonium peroxodisulfate. Likewise preferred initiators are peroxodisulfates, such as sodium peroxodisulfate. Preferably, the amount of free radical initiator systems used, based on the total amount of the monomers for polymerization, is from 0.1 to 2% by weight.

Surface-active substances suitable for conducting the emulsion polymerization are the emulsifiers and protective colloids commonly used for this purpose. The surface-active substances are used normally in amounts of up to 10% by weight, preferably from 0.5 to 5% by weight, and in particular from 1.0 to 4% by weight, based on the monomers to be polymerized.

Examples of suitable protective colloids are polyvinyl alcohols, starch derivatives and cellulose derivatives and vinylpyrrolidone copolymers. A detailed description of further suitable protective colloids can be found in Houben-Weyl, Methoden der organischen Chemie, volume XIV/1, Makromolekulare Stoffe, Georg-Thieme-Verlag, Stuttgart 1961, pp. 411–420.

Suitable emulsifiers for the free-radical emulsion polymerization are the abovementioned emulsifiers. In the preparation of the binder polymers P of the invention it is preferred to use no protective colloids.

The molecular weight of the polymers P may be adjusted by adding small amounts, generally up to 2% by weight, based on the monomers to be polymerized, of one or more molecular weight regulator substances, examples being organic thio compounds, silanes, allyl alcohols, and aldehydes.

The emulsion polymerization may take place either continuously or by the batch procedure, preferably by a semicontinuous process. In semicontinuous processes the majority, i.e., at least 70%, preferably at least 90%, of the monomers for polymerization is supplied continuously, including staged or gradient procedures, to the polymerization batch. This procedure is also referred to as the monomer feed technique. The term monomer feed (stream) refers to liquid monomer mixtures, monomer solutions or, in particular, aqueous monomer emulsions.

In addition to the seed-free mode of preparation, it is possible for the purpose of establishing a defined polymer particle size to conduct the emulsion polymerization by the seed latex process or in the presence of seed latex prepared in situ. Processes for this purpose are known and can be found in the prior art (see EP-B 40419, EP-A-614 922, EP-A-567 812 and literature cited therein, and also 'Encyclopedia of Polymer Science and Technology', Vol. 5, John Wiley & Sons Inc., New York 1966, p. 847).

The polymerization is preferably carried out in the presence of from 0.01 to 3% by weight, and in particular from 0.02 to 1.5% by weight, of a seed latex (solids content of the seed latex, based on total monomer amount), preferably with seed latex introduced initially (initial-charge seed). The seed latex may also be generated in situ from the monomers for polymerization by initially introducing a small amount of the monomers for polymerization in the form of an aqueous emulsion together with a portion of the surface-active substance, heating this emulsion to polymerization temperature, and then adding a portion of the initiator.

The pressure and temperature of polymerization are of minor importance. In general, it is carried out at temperatures between room temperature and 120 °C., preferably at temperatures from 40 to 100° C., and with particular preference between 50 and 95° C.

Following the polymerization reaction proper it may be necessary to free the aqueous polymer dispersions of the invention substantially from odorous substances, such as residual monomers and other volatile organic constituents. This can be done conventionally by physical means, by distillative removal (especially by steam distillation) or by stripping with an inert gas. The reduction in the amount of residual monomers may also be effected chemically by means of free-radical postpolymerization, in particular under the action of redox initiator systems, as set out, for example, in DE-A-44 35 422, DE-A 44 35 423 or DE-A 44 19 518. Preferably, the postpolymereization is carried out with a redox initiator system comprising at least one organic peroxide and one organic sulfite. Particularly suitable peroxides for the redox-initiated postpolymerization include not only hydrogen peroxide but also tert-butyl hydroperoxide, cumene hydroperoxide, and alkali metal peroxodisulfates, such as sodium and ammonium peroxodisulfate. Examples of suitable reducing agents are sodium disulfite, sodium hydrogen sulfite, sodium dithionite, sodium hydroxymethanesulfinate, formamidinesulfonic acid, ascorbic acid, acetone-bisulfite adduct, reducing sugar compounds, or water-soluble mercaptans, e.g., 2-mercaptoethanol. For redox-initiated postpolymerization, a soluble salt of a metal of varying valence may be added to the redox system, examples being salts of iron, of copper or of vanadium, and, if desired, complexing agents such as EDTA. The redox-initiated postpolymerization takes place preferably at temperatures in the range from 10 to 100° C., in particular at from 20 to 90° C. Postpolymerization generally takes place over a period of from 10 minutes to 4 hours. The initiator for the postpolymerization may be added in one or more portions, dissolved or undissolved, or continuously. For the redox-initiated postpolymerization the redox partners are preferably added separately from one another.

Before being used in the formulations of the invention, the dispersions of the polymer P are preferably adjusted to a pH in the range from 6 to 10, preferably by addition of a nonvolatile base, e.g., alkali metal hydroxides or alkaline earth metal hydroxides, or nonvolatile amines. Nonvolatile amines are, for example, ethoxylated diamines or polyamines, examples being the products sold under the commercial designation Jeffamine® (Texaco Chemical Co.).

The aqueous polymer dispersions of the binder polymer P obtained by the route of free-radical aqueous emulsion polymerization generally have solids contents in the range from 40 to 70% by weight. They can be used directly, without further processing, as binder formulations. Alternatively, they may be compounded with the additives customary for the application in question to form a binder formulation. Furthermore, they may contain one or more biocides, e.g., 3-isothiazolones, for the purpose of preventing microbial infestation. In general, following their deodorization, the binder formulations of the invention contain less than 1000 ppm, preferably less than 500 ppm, of volatile organic compounds such as solvents or unpolymerized monomers.

Even without the addition of volatile organic substances such as plasticizers or solvents, the binder formulations of the invention form stable polymer films of low tack and good blocking resistance which undergo minimal swelling on exposure to moisture.

The binders of the invention based on aqueous dispersions of the polymer P are particularly suitable, for the abovementioned reasons, for the preparation of solvent-free coating compositions. Solvent-free coating compositions generally contain less than 1000 ppm of volatile organic compounds. Volatile organic compounds are those compounds which have a boiling point of below 260° C. under atmospheric pressure. Examples of coating compositions are polymer dispersion plasters, sealing compounds for porous components, and especially pigmented coating compositions such as emulsion paints. The binder formulations of the invention are particularly suitable for preparing emulsion paints. Accordingly, the present invention additionally provides emulsion paints comprising at least one binder based on an aqueous polymer dispersion of the polymer P, and in particular those emulsion paints which contain less than 1000 ppm, and especially less than 500 ppm, of volatile organic solvents.

The emulsion paints of the invention generally contain from 30 to 75% by weight, and preferably from 40 to 65% by weight, of nonvolatile constituents. These include all constituents of the formulation other than water, but at least the total amount of binder polymer P, filler, pigment, and polymeric auxiliaries. Of said total amount, approximately i) from 3 to 90% by weight, preferably from 10 to 60% by weight, is accounted for by solid binder constituents (polymer P)

ii) from 5 to 85% by weight, preferably from 10 to 50% by weight, by at least one inorganic pigment, and also iii) from 0 to 85% by weight, preferably from 5 to 60% by weight, by inorganic fillers, and iv) from 0.1 to 40% by weight, preferably from 0.5 to 20% by weight, by customary auxiliaries, the pigment volume concentration PVC of the coating compositions being in accordance with the invention at least 10, preferably at least 15, and in particular at least 20, and generally not exceeding 80.

Owing to the low tack of the coatings based on the binder formulations of the invention, the formulations of the invention are particularly suitable for low- and medium-pigmented coating compositions such as semigloss paints, latex paints, and wet room paints, which generally have a PVC in the range from 25 to 50. In the latter case, the low swellability of the filmed binder on exposure to moisture is also particularly advantageous.

Typical pigments ii) for the formulations of the invention, especially for emulsion paints, are titanium dioxide, preferably in the rutile form, barium sulfate, zinc oxide, zinc sulfide, basic lead carbonate, antimony trioxide, and lithopones (zinc sulfide+barium sulfate). However, the formulations may also contain colored pigments, examples being iron oxides, carbon black, graphite, luminescent pigments, zinc yellow, zinc green, ultramarine, manganese black, antimony black, manganese violet, Paris Blue or Schweinfurt Green.

Suitable fillers iii) include alumosilicates, such as feldspars, silicates, such as kaolin, talc, mica, magnesite, alkaline earth metal carbonates, such as calcium carbonate, in the form of calcite or chalk, for example, magnesium carbonate, dolomite, alkaline earth metal sulfates, such as calcium sulfate, silica, etc. The fillers may be used as individual components. Mixtures of fillers have proven particularly suitable in the art, examples being calcium carbonate/kaolin and calcium carbonate/talc.

In order to increase the hiding power and to save on the use of white pigments it is common in the preferred emulsion paints to use finely divided fillers (extenders), examples being finely divided calcium carbonate or mixtures of different calcium carbonates having different particle sizes. To adjust the hiding power, the shade and the depth of color it is preferred to employ blends of color pigments and fillers.

The customary auxiliaries iv) include wetting agents or dispersants, such as sodium, potassium or ammonium polyphosphates, alkali metal salts and ammonium salts of polyacrylic acids and of polymaleic acid, polyphosphonates, such as sodium 1-hydroxyethane-1,1-diphosphonate, and also salts of naphthalenesulfonic acids, especially their sodium salts. The dispersants are generally used in an amount of from 0.1 to 1.0% by weight, based on the total weight of the emulsion paint. The auxiliaries iv) further generally include defoamers, preservatives, hydrophobicizers, biocides, fibers, or further constituents.

Furthermore, the auxiliaries iv) may also include thickeners, examples being cellulose derivatives, such as methyl cellulose, hydroxyethylcellulose and carboxymethylcellulose, and also casein, gum arabic, tragacanth gum, starch, sodium alginate, polyvinyl alcohol, polyvinylpyrrolidone, sodium polyacrylates, water-soluble copolymers based on acrylic and methacrylic acid, such as acrylic acid-acrylamide and methacrylic acid-acrylate copolymers, and what are known as associative thickeners, examples being styrene-maleic anhydride polymers or, preferably, hydrophobically modified polyether urethanes, as are described, for example, by N. Chen et al. in J. Coatings Techn., Vol. 69, No. 867, 1997, p. 73 and by R. D. Hester et al. in J. Coatings Techn., Vol. 69, No. 864, 1997, p. 109, the content of which is hereby incorporated in its entirety by reference. Inorganic thickeners as well, examples being bentonites or hectorite, may be used. Thickeners are generally used in amounts of from 0.1 to 10% by weight, preferably from 0.1 to 5% by weight, based on the total weight of the aqueous formulation.

The examples set out below are intended to illustrate the invention but without restricting it.

I. Preparation and Characterization of the Polymer Dispersions (Polymers P)

The average particle size (z-average) of the polymer particles was found by dynamic light scattering (photon correlation spectroscopy) on a 0.01% by weight dispersion in water at 23° C. using an Autosizer IIc from Malvern Instruments, England. The value stated is the cumulant z-average diameter of the measured autocorrelation function.

The minimum film-forming temperature (MFT) of the polymer dispersions was determined in accordance with DIN 53787 (see also Ullmanns Enzyklopädie der technischen Chemie, 4th edition, vol. 19, VCH Weinheim 1980, p. 17). The measuring device used was what is known as a film formation bench (a metal plate to which a temperature gradient is applied). The aqueous polymer dispersion is then applied to the film formation bench with a wet film thickness of 0.5 mm. At those areas of the film formation bench whose temperature is above the MFT a clear film forms on drying, while in the cooler areas cracks appear in the film and at even lower temperatures a white powder is formed.

General Preparation Procedure

A polymerization vessel was charged with 340 g of deionized water and 21 g of a 34% by weight, aqueous polystyrene seed dispersion ($d_{50}$ about 35 nm) and this initial charge was heated to 90° C. At the same temperature, 5.4 g of feed stream II were added. After 5 minutes, at the same temperature, feed stream I and the remainder of feed stream II were added over the course of 150 minutes to the polymerization vessel. After the end of the feed streams, the temperature was held for a further 30 minutes, followed by cooling to 80°C. At this temperature, 7.5 g of a 10% strength by weight aqueous solution of tert-butyl hydroperoxide were introduced into the polymerization vessel over the course of 30 minutes. Synchronously, a solution of 0.79 g of sodium disulfite and 0.48 g of acetone in 16 ml of deionized water was added. Subsequently, 30 g of a 10% strength by weight sodium hydroxide solution were added over the course of 5 minutes at 80° C. The resulting dispersion was then treated with steam in the manner of a circulation deodorization. The dispersion was subsequently cooled to room temperature and filtered through a metal filter having a mesh size of 250 μm. The resulting dispersions had a solids content of 49–50% by weight and a pH of 8. The minimum film-forming temperature of all dispersions was ≦2° C.

Feed stream I: aqueous monomer emulsion of
    243 g of deionized water[1]
    750 g of monomers (for composition see Table 1)
    4 g of emulsifier (as an aqueous solution; see key to Table 1)

Feed stream II:
    3.75 g of sodium peroxodisulfate
    49.82 g of deionized water

[1] In the case of experiment 7, 216 g, and in the case of experiment 8, 250 g, of water were used.

TABLE 1

| Ex. | BA [g] | S [g] | MMA [g] | EHA [g] | MAA [g] | AM [g] | AA [g] | UMA [g] | HEA [g] | AAMA [g] | Emulsifier anionic | Emulsifier nonionic |
|---|---|---|---|---|---|---|---|---|---|---|---|---|
| 1 | 450.0 | 198.8 | 75.0 | 0 | 18.8 | 15.0 | 0 | 0 | 0 | 0 | A + B[1] | C[3] |
| C2 | 450.0 | 198.8 | 75.0 | 0 | 0 | 15.0 | 18.8 | 0 | 0 | 0 | A + B | C |
| 3 | 450.0 | 273.8 | 0 | 0 | 18.8 | 15.0 | 0 | 0 | 0 | 0 | A + B | C |
| C4 | 450.0 | 0 | 273.8 | 0 | 18.8 | 15.0 | 0 | 0 | 0 | 0 | A + B | C |
| 5 | 0 | 279.8 | 75.0 | 369.0 | 18.8 | 15.0 | 0 | 0 | 0 | 0 | A + B | C |
| 6 | 450.0 | 198.8 | 60.0 | 0 | 18.8 | 15.0 | 0 | 15.0 | 0 | 0 | A + B | C |
| 7 | 450.0 | 198.8 | 75 | 0 | 18.8 | 15.0 | 0 | 0 | 0 | 0 | B[2] | C |
| 8 | 450.0 | 198.8 | 75 | 0 | 18.8 | 15.0 | 0 | 0 | 0 | 0 | A + B | D[4] |
| 9 | 450.0 | 198.8 | 75 | 0 | 18.8 | 0 | 0 | 0 | 7.5 | 0 | A + B | C |
| C10 | 450.0 | 198.8 | 93.8 | 0 | 0 | 15 | 0 | 0 | 0 | 0 | A + B | C |
| 11 | 450.0 | 198.8 | 60 | 0 | 18.8 | 15 | 0 | 0 | 0 | 15.0 | A + B | C |

BA = butyl acrylate  
S = styrene  
MMA = methyl methacrylate  
EHA = 2-ethylhexyl acrylate  
MAA = methacrylic acid  
AM = acrylamide (50% strength by weight aqueous solution)  
AA = acrylic acid  
UMA = N-(2-methacryloyloxyethyl)imidazolin-2-one  
HEA = hydroxyethyl acrylate  
AAMA = 2-acetoacetoxyethyl methacrylate Emulsifiers 1) A+B:13.3 g of a 45% strength by weight aqueous solution of bissodium p-dodecyldiphenyl ether disulfonate and 40.0 g of a 15% strength by weight aqueous solution of sodium dodecylsulfate; Dowfax® 2A1.
2) B: 80 g of a 15% strength by weight aqueous solution of sodium dodecylsulfate.
3) C: 56.3 g of a 20% strength by weight aquoeus solution of an ethoxylated $C_{16}$–$C_{18}$ fatty alcohol (average degree of ethoxylation of 18).
4) D: 56.3 g of a 20% strength by weight aqueous solution of an ethoxylated isotridecanol (average degree of ethoxylation of 8).

TABLE 2

| Example | PS (nm) 1) | $T_g$ (° C.) 2) |
|---|---|---|
| 1 | 148 | 3.9 |
| C2 | 150 | 3.7 |
| 3 | 144 | 3.9 |
| C4 | 140 | 7.7 |
| 5 | 153 | 6.8 |
| 6 | 151 | 7 |
| 7 | 142 | 7.2 |
| 8 | 147 | 4.9 |
| 9 | 147 | 6.8 |
| C10 | 149 | 2.8 |
| 11 | 144 | 0.6 |

1) particle size in [nm]
2) glass transition temperature (midpoint, determined by means of DSC in accordance with ASTM-D 3418–82) in ° C.

2. Emulsion Paints of the Invention

The emulsion paints of the invention were prepared by blending the components stated in Table 3 for the formula in the sequence specified therein (from top to bottom) using a dissolver. The varying solids content of the dispersions used was compensated by adding water.

TABLE 3

| Paint formula (amounts in g) | |
|---|---|
| Water | 140 |
| Pigment dispersant 1) | 8 |
| preservative 2) | 2 |
| Defoamer 3) | 3 |
| Hydroxyethylcellulose (4% aqueous solution) 4) | 25 |
| Polyurethane thickener (5% aqueous solution) 5) | 80 |
| TiO$_2$ (rutile, 0.3 µm) 6) | 190 |
| Chalk (0.9 µm) 7) | 90 |
| Talc / dolomite <10 µm 8) | 20 |
| Defoamer 3) | 1 |
| Dispersion (50% by weight) | 420 |

1) Pigmentverteiler MD 20 dispersant based on a maleic acid-diisobutene copolymer sodium salt, 25% in water, BASF AG, Ludwigshafen
2) Parmetol A 26 preservative, Schulke & Mayr GmbH, Norderstedt
3) Byk 022 or 024 defoamer, Byk-Chemie GmbH, Wesel
4) Natrosol 250 HHR hydroxyethylcellulose, high-viscosity, Hercules GmbH, Dusseldorf
5) Tafigel PUR 50 polyurethane thickener, Münzing GmbH, Heilbronn
6) Tioxide R-HD 2 titanium dioxide, Tioxide Europe GmbH, Ratingen
7) Omyacarb Extra GU calcium carbonate (Marmor), 0.9 µ average particle diameter, Omya GmbH, Cologne
8) Naintsch SE micro talc/dolomite, Luzenac Deutschland GmbH, Dusseldorf Testing the Blocking Resistance of the Coating Films Obtained from the Emulsion Paints of the Invention The dispersions and coating materials were drawn down onto Leneta sheets using a box-type coater with a gap height of 200 µm. The films were dried under climatic conditions for 4 days. Subsequently, squares with a side length of 5 cm were cut from the coated sheet. 2 squares each were then placed together, coating against coating, in a climate-controlled cabinet and weighted down with a 2 kg weight (temperature and duration as stated in Table 4). After the exposure time had expired, the specimens were cooled to room temperature and the force required to separate the two sheets was assessed (0=sheets fell apart, 5=sheets were inseparable).

Testing the Tack of the Dispersion Films

The contact tack of the dispersion films was determined by the method of Zosel (see A. Zosel, Lack- und Polymerfilme, Vincentz-Verlag, 1996, p. 135 ff.; structure of the apparatus p. 136) using a steel die. The measurement was made at 23° C. and 50% relative atmospheric humidity. The steel die (diameter 2 mm) was pressed onto the coating with a force of 1 N for 10 seconds.

Testing the Water Absorption of the Dispersion Films

The water absorption is the amount of water abosrbed by a polymer film after storage in water for 24 h. The water absorption is reported in % by weight based on the mass of the film at the beginning of the measurement.

Procedure for Determining the Water Absorption

The aqueous polymer dispersions diluted with deionized water to a solids content of 25% by weight were used to prepare polymer films with a thickness of approximately 500 µm by filming a defined amount of the dilute aqueous polymer dispersion in a silicone tray over a period of 7 d at 23° C. and 50% relative atmospheric humidity. The polymer films were subsequently removed from the silicone tray and flat (4×5 cm) film sections were punched out. These sections were stored in 100 ml of deionized water at 23° C. for 24 h. The water absorption of the film sections was determined gravimetrically after the specimens had been removed and freed from superficially adherent water by padding them with nonfibrous filter paper. The water absorption is reported in % by weight in Table 4 based on the mass of the film at the beginning of the measurement.

TABLE 4

| Example | Blocking resistance film 1 h at 40° C. | Blocking resistance paint 24 h at 60° C. | Tack film at 23° C. [J/m$^2$] | Water absorption film after 24 h [% by wt.] |
|---|---|---|---|---|
| 1 | 2 | 0–1 | 4.6 | 12.1 |
| C2 | 3 | 3 | 14.3 | 32.9 |
| 3 | 2–3 | 0–1 | 10.8 | 10.1 |
| C4 | 2 | 2 | 13.8 | 25.1 |
| 5 | 1–2 | 0 | 4.2 | 6.6 |
| 6 | 1–2 | 3 | 12.1 | 18.1 |
| 7 | 1–2 | 0–1 | 10.6 | 14.1 |
| 8 | 1–2 | 0–1 | 7.7 | 15.8 |
| 9 | 2 | 1–2 | 11.7 | 13.5 |
| C10 | 1–2 | 4 | 17.1 | 13.8 |
| 11 | 1–2 | 0 | 10.5 | 12.2 |

We claim:
1. A binder formulation, comprising:
   at least one binder polymer P in the form of an aqueous dispersion comprising at least one anionic emulsifier and at least one nonionic emulsifier;
   wherein said binder formulation has a minimum film-forming temperature of below 10° C.; and
   wherein said binder polymer P comprises in copolymerized form:
      from 20 to 50% by weight of at least one monomer A1 selected from the group consisting of vinylaromatic monomers,
      from 5 to 15% by weight of one or more monomers A2 selected from the group consisting of $C_1$–$C_4$ alkyl esters of methacrylic acid, from 0 to 30% by weight of one or more monomers A3 selected from the group consisting of acrylonitrile and methacrylonitrile, from 45 to 70% by weight of at least one monomer B whose homopolymer has a glass transition temperature of below 10° C.; wherein monomer B is selected from the group consisting of $C_1$–$C_{18}$ alkyl esters of acrylic acid and $C_5$–$C_{18}$ alkyl esters of methacrylic acid, from 2 to 4% by weight of methacrylic acid as monomer C, from 0 to 3% by weight of one or more monomers D selected from the group consisting of amides of monoethylenically unsaturated $C_3$–$C_6$ monocarboxylic acids, $C_1$–$C_4$ hydroxyalkyl esters of monoethylenically unsaturated $C_3$–$C_6$ monocarboxylic acids and $C_1$–$C_4$ alkyl polyalkylene oxide esters of monoethylenically unsaturated $C_3$–$C_6$ monocarboxylic acids, from 0 to 5% by weight of one or more monomers E other than the monomers A1, A2, A3, B, C and D;

wherein an amount of each monomer is based on 100% by weight of a total amount of all monomers; and wherein a sum of the amounts of the monomers A1, A2 and A3 does not exceed 55% by weight.

2. The binder formulation as claimed in claim 1, wherein said binder polymer P comprises in copolymerized form from 20 to 40% by weight of styrene as monomer A1, and from 5 to 15% by weight of methyl methacrylate as monomer A2.

3. The binder formulation as claimed in claim 1, wherein said monomer B is selected from the group consisting of ethyl acrylate, n-butyl acrylate, and 2-ethylhexyl acrylate.

4. The binder formulation as claimed in claim 1, wherein said anionic emulsifier is selected from the group consisting of $C_{10}$–$C_{18}$ alkyl sulfates, sulfates of ethoxylated $C_{10}$–$C_{20}$ alkanols having a degree of alkoxylation≦5, mono-($C_8$–$C_{16}$ alkyl)diphenyl ether disulfonates and di($C_8$–$C_{16}$ alkyl) diphenyl ether disulfonates.

5. The binder formulation as claimed in claim 1, wherein said nonionic emulsifier is selected from the group consisting of ethoxylated $C_{10}$–$C_{22}$ alkanols having an average degree of ethoxylation of from 8 to 50.

6. The binder formulation as claimed in claim 4, comprising as anionic emulsifier a) at least one $C_{10}$–$C_{18}$ alkyl sulfate and b) at least one mono-($C_{10}$–$C_{20}$ alkyl)diphenyl ether disulfonate or di($C_{10}$–$C_{20}$ alkyl)diphenyl ether disulfonate.

7. The binder formulation as claimed in claim 1, wherein said binder polymer P comprises in copolymerized form from 50 to 65% by weight of butyl acrylate, 2-ethylhexyl acrylate or both, from 20 to 40% by weight of styrene, from 5 to 10% by weight of methyl methacrylate, from 2 to 4% by weight of methacrylic acid, from 1 to 2% by weight of acrylamide and/or hydroxyethyl acrylate, and from 0 to 2% by weight N-(2-methacryloxyethyl)-imidazolin-2-one.

8. An emulsion paint, comprising:

at least one binder formulation as defined in claim 1.

9. The emulsion paint as claimed in claim 8, which comprises less than 1000 ppm of volatile organic compounds.

10. The emulsion paint as claimed in claim 8, having a pigment volume concentration of from 25 to 50.

11. The binder formulation as claimed in claim 1, wherein an amount of said anionic emulsifier is from 0.5 to 3% by weight, based on said binder polymer P;

wherein an amount of said nonionic emulsifier is from 0.3 to 3% by weight; and wherein a total amount of said anionic emulsifier and said nonionic emulsifier is from 0.8 to 4% by weight.

12. The binder formulation as claimed in claim 11, wherein said anionic emulsifier is selected from the group consisting of $C_{10}$–$C_{18}$ alkyl sulfates, sulfates of ethoxylated $C_{10}$–$C_{20}$ alkanols having a degree of alkoxylation≦5, mono-($C_8$–$C_{16}$ alkyl)diphenyl ether disulfonates and di($C_8$–$C_{16}$ alkyl)diphenyl ether disulfonates.

13. The binder formulation as claimed in claim 11, wherein said nonionic emulsifier is selected from the group consisting of ethoxylated $C_{10}$–$C_{22}$ alkanols having an average degree of ethoxylation of from 8 to 50.

14. The binder formulation as claimed in claim 11, comprising as anionic emulsifier a) at least one $C_{10}$–$C_{18}$ alkyl sulfate and b) at least one mono-($C_{10}$–$C_{20}$ alkyl) diphenyl ether disulfonate or di($C_{10}$–$C_{20}$ alkyl)diphenyl ether disulfonate.

15. The binder formulation as claimed in claim 1, wherein said binder polymer P comprises in copolymerized form of from 0.5 to 2 by weight of at least one monomer D.

16. The binder formulation as claimed in claim 15, wherein an amount of said anionic emulsifier is from 0.5 to 3% by weight, based on said binder polymer P;

wherein an amount of said nonionic emulsifier is from 0.3 to 3% by weight; and wherein a total amount of said anionic emulsifier and said nonionic emulsifier is from 0.8 to 4% by weight.

17. The binder formulation as claimed in claim 16, wherein said anionic emulsifier is selected from the group consisting of $C_{10}$–$C_{18}$ alkyl sulfates, sulfates of ethoxylated $C_{10}$–$C_{20}$ alkanols having a degree of alkoxylation≦5, mono-($C_8$–$C_{16}$ alkyl)diphenyl ether disulfonates and di($C_8$–$C_{16}$ alkyl)diphenyl ether disulfonates.

18. The binder formulation as claimed in claim 16, wherein said nonionic emulsifier is selected from the group consisting of ethoxylated $C_{10}$–$C_{22}$ alkanols having an average degree of ethoxylation of from 8 to 50.

19. The binder formulation as claimed in claim 16, comprising as anionic emulsifier a) at least one $C_{10}$–$C_{18}$ alkyl sulfate and b) at least one mono-($C_{10}$–$C_{20}$ alkyl) diphenyl ether disulfonate or di($C_{10}$–$C_{20}$ alkyl)diphenyl ether disulfonate.

20. The binder formulation as claimed in claim 7, wherein an amount of said anionic emulsifier is from 0.5 to 3% by weight, based on said binder polymer P;

wherein an amount of said nonionic emulsifier is from 0.3 to 3% by weight; and wherein a total amount of said anionic emulsifier and said nonionic emulsifier is from 0.8 to 4% by weight.

21. The binder formulation as claimed in claim 20, wherein said anionic emulsifier is selected from the group consisting of $C_{10}$–$C_{18}$ alkyl sulfates, sulfates of ethoxylated $C_{10}$–$C_{20}$ alkanols having a degree of alkoxylation≦5, mono-($C_8$–$C_{16}$ alkyl)diphenyl ether disulfonates and di($C_8$–$C_{16}$ alkyl)diphenyl ether disulfonates.

22. The binder formulation as claimed in claim 20, wherein said nonionic emulsifier is selected from the group consisting of ethoxylated $C_{10}$–$C_{22}$ alkanols having an average degree of ethoxylation of from 8 to 50.

23. The binder formulation as claimed in claim 20, comprising as anionic emulsifier a) at least one $C_{10}$–$C_{18}$ alkyl sulfate and b) at least one mono-($C_{10}$–$C_{20}$ alkyl) diphenyl ether disulfonate or di($C_{10-20}$ alkyl)diphenyl ether disulfonate.

24. The binder formulation as claimed in claim 1, wherein said monomer E contains an urea group.

25. The binder formulation as claimed in claim 1, wherein said monomer E is present in an amount of from 0.1 to 5% by weight.

26. The binder formulation as claimed in claim 1, wherein said monomer E contains a siloxane group.

27. The binder formulation as claimed in claim 26, wherein said monomer E is present in an amount of from 0.05 to 0.5% by weight.

* * * * *